United States Patent [19]

Pagano et al.

[11] Patent Number: 5,966,795

[45] Date of Patent: Oct. 19, 1999

[54] FILM SLIDE AND FILM EXTRACTOR

[75] Inventors: Daniel M. Pagano; Dale F. McIntyre, both of Honeoye Falls; David L. Patton, Webster; Edward Weissberger, Pittsford, all of N.Y.

[73] Assignee: Eastman Kodak Company, Rochester, N.Y.

[21] Appl. No.: 08/896,841

[22] Filed: Jul. 18, 1997

[51] Int. Cl.$^6$ .................................................. B23P 19/00
[52] U.S. Cl. .................... 29/426.3; 29/426.5; 29/700; 29/DIG. 105; 40/709
[58] Field of Search .............................. 29/426.1, 426.3, 29/426.5, 700, DIG. 95, DIG. 105; 242/600; 396/397, 440; 40/701, 705, 709, 775

[56] References Cited

U.S. PATENT DOCUMENTS

| 3,530,608 | 9/1970 | Sovia | 40/701 |
|---|---|---|---|
| 3,581,422 | 6/1971 | Kondo | 40/701 |
| 3,952,434 | 4/1976 | Florjancio | 40/152 |
| 4,395,819 | 8/1983 | Thompson | 29/806 |
| 5,392,548 | 2/1995 | True et al. | 40/705 |

FOREIGN PATENT DOCUMENTS

| 2461276 | 1/1981 | France . |
|---|---|---|
| 8812494 | 1/1988 | Germany . |

Primary Examiner—P. W. Echols
Assistant Examiner—John Hong
Attorney, Agent, or Firm—Robert Luke Walker

[57] ABSTRACT

A slide mount has a first portion and a second portion. The first portion includes an interior region, an edge, and a slot extending from the interior region to the edge. A cavity is formed between the first portion and the second portion, and extends to the first edge, with a film segment in the cavity extracted therefrom by a film extraction system. The film extraction system includes a piston for disengaging a latch mechanism from the film segment. An extractor arm enters the slot to engage a second perforation in the film segment, and slidably moves within the slot to move the film segment through and out of the cavity toward a roller. The film extraction system operates with the slide mount according to a method including the steps of: extending the piston into a locking aperture in the slide mount; disengaging a latch end from a first perforation in the film segment; extending the extractor arm into the extraction slot; engaging a second perforation in the film segment with the extractor arm; and moving the extractor arm through extraction slot to move the film segment out of the cavity.

13 Claims, 9 Drawing Sheets

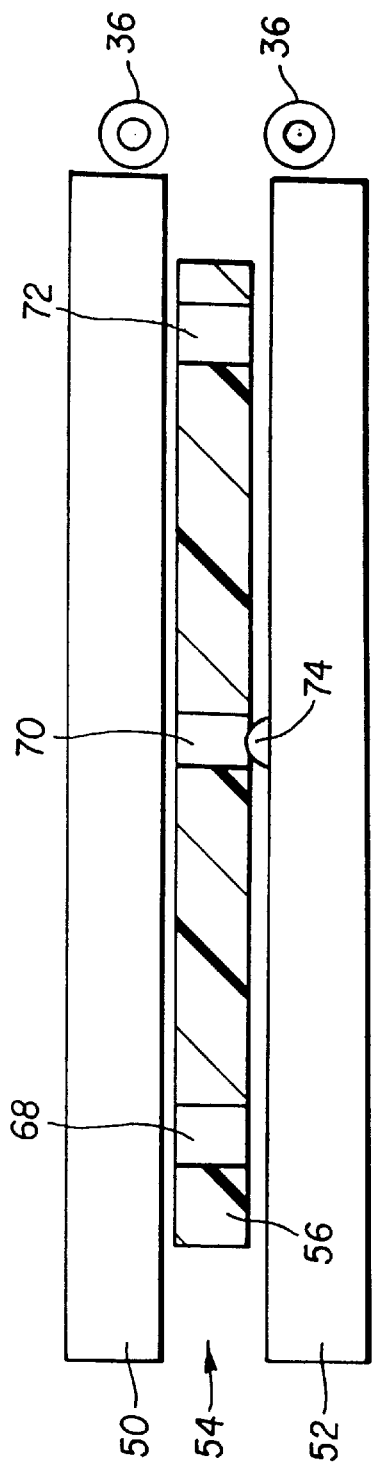
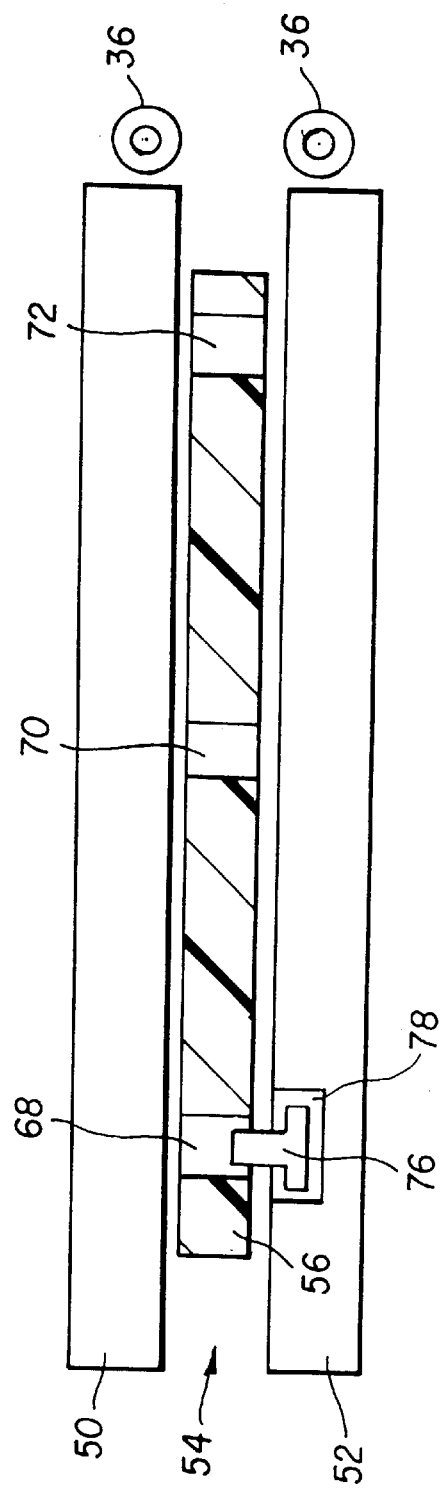
FIG. 3
FIG. 4

FILM SLIDE AND FILM EXTRACTOR

CROSS REFERENCE TO RELATED APPLICATIONS

Reference is made to commonly assigned U.S. patent applications Ser. No. 08/775,677 now U.S. Pat. No. 5,743,609 entitled: METHOD AND APPARATUS FOR PREPARING PHOTOGRAPHIC FILM UNITS HAVING IMAGE FRAME ASSOCIATED ENCODED INFORMATION, and filed in the names of Richard Bauer, Dale McIntyre, Daniel Pagano, David Patton, and Edward Weissberger; Ser. No. 08/775,326, now U.S. Pat. No. 5,743,615 entitled: FILM SLIDES HAVING ENCODED DATA AND METHODS FOR PREPARING FILM SLIDES, and filed in the names of Dale McIntyre, Daniel Pagano, David Patton, and Edward Weissberger; Ser. No. 08/775,814, now U.S. Pat. No. 5,751,399 entitled: FILM SLIDES HAVING DATA WINDOWS, and filed in the names of Dale McIntyre, Daniel Pagano, David Patton, and Edward Weissberger; Ser. No. 08/775,321, now U.S. Pat. No. 5,803,565 entitled: ORIENTING PROJECTOR, and filed in the names of Dale McIntyre, Daniel Pagano, David Patton, and Edward Weissberger; Ser. No. 08/775,816, now U.S. Pat. No. 5,738,428 entitled: FORMATTING PROJECTOR, and filed in the names of Dale McIntyre, Daniel Pagano, David Patton, and Edward Weissberger; Ser. No. 08/775,847, entitled: ANNOTATION DISPLAYING PROJECTOR, and filed in the names of Dale McIntyre, Daniel Pagano, David Patton, and Edward Weissberger; Ser. No. 08,896,374 now U.S. Pat. No. 5,837,079 entitled: FILM ORIENTING SLIDE MOUNTER AND METHOD, and filed in the names of David Patton, Daniel Pagano, Dale McIntyre, and Edward Weissberger; Ser. No. 08/897,169 entitled: DEFINED ORIENTATION SLIDE PROJECTOR AND SLIDES, and filed in the names of Daniel Pagano, David Patton, Dale McIntyre, and Edward Weissberger; Ser. No. 08/897,171 entitled: FILM SEGMENT PRINTING SYSTEM AND METHOD, and filed in the names of David Patton, Daniel Pagano, Dale McIntyre, and Edward Weissberger; Ser. No. 08/896,844 entitled: SLIDE WITH MAGNETIC MARKS THAT CAN BE READ BY MULTIPLE HEADS, and filed in the names of Dale McIntyre, Daniel Pagano, David Patton, and Edward Weissberger; each of which are assigned to the assignee of this application.

FIELD OF THE INVENTION

This invention relates generally to the field of film slides, and in particular to film slide extractors and film slides for the extraction of film segments, as well as methods for extracting film segments from film slides using film slide extractors.

BACKGROUND OF THE INVENTION

Film slides are convenient devices for mounting film segments storing images for projection and display. Some prior art film slides and other film mounting apparatus mount film segments permanently in a frame or slide mount. Other apparatus, such as described in U.S. Pat. Nos. 3,530,608; 3,581,422; and 5,392,548 are examples of apparatus for mounting and dismounting film with respect to the frame or slide mount.

Heretofore, once a film segment was mounted, the dismounting of such film segments for replacement, for cataloging, for repair, etc. was performed manually. However, manual dismounting is ill-adapted to high speed film handling systems, since the film mounting apparatus must be manually dismantled, and the film segment then manually removed for subsequent handling.

Further, such dismantling may warp, damage, or destroy the film mounting apparatus, so it cannot be used further.

In addition, after manual removal, it is incumbent upon the person removing the film segment to accurately position the removed film segment in a proper orientation for later handling of the film segment. Such manual operations are fraught with difficulties; in particular, manual operations may have error rates which are reduced, for example, by increasing handling time per film segment to ensure accuracy. Such error reduction techniques therefore result in slow handling rates.

Accordingly, a need exists for a film slide adapted for easy dismounting of the film segment therein without damage to the film slide. In addition, a need exists for a film slide dismounting system and method for high speed and highly accurate removal and handling of film segments.

SUMMARY OF THE INVENTION

It is recognized herein that a film slide may be constructed which permits relatively easy dismounting of the film segment therefrom without damage to the film slide. In addition, an automated film slide dismounting system and method is provided which may be operated at relatively high speed and with highly accurate removal and handling of film segments in high volume film handling applications.

A slide mount is disclosed having a first portion and a second portion adjacent to the first portion. The first portion includes an interior region, an edge, and a slot extending from the interior region to the edge. At least one of the first and second portions form a cavity between the first and second portions extending to at least the edge, and the cavity is dimensioned for positioning a film segment therein so as to permit relatively easy extraction of the film segment therefrom.

The slide mount is used in a film extraction system which includes a piston for contacting a latch mechanism to disengage it from the film segment, and an extractor arm for entering the slot to engage a perforation in the film segment, and for slidably engaging the slot so as to move the film segment through the cavity in the direction of the edge of the slide mount so it exits the cavity. The film extraction system operates with the slide mount according to a method including the steps of: (a) extending a piston into a locking aperture in the slide mount, (b) disengaging a latch end from a first perforation in the film segment, (c) extending an extractor arm into an extraction slot in the slide mount, (d) engaging a second perforation in the film segment with the extractor arm, and (e) moving the extractor arm through the extraction slot to move the film segment out of the slide mount.

BRIEF DESCRIPTION OF THE DRAWINGS

The features and advantages of the present invention will be readily apparent, and are to be understood, by referring to the following detailed description of the preferred embodiments of the present invention, taken in conjunction with the accompanying drawings, in which:

FIG. 3 is a side cross-sectional view of the slide and film segment positioned therein along lines 3—3 of FIG. 2;

FIG. 4 is a side cross-sectional view of the slide and film segment positioned therein along lines 4—4 of FIG. 2;

DETAILED DESCRIPTION OF THE INVENTION

Figure 1:
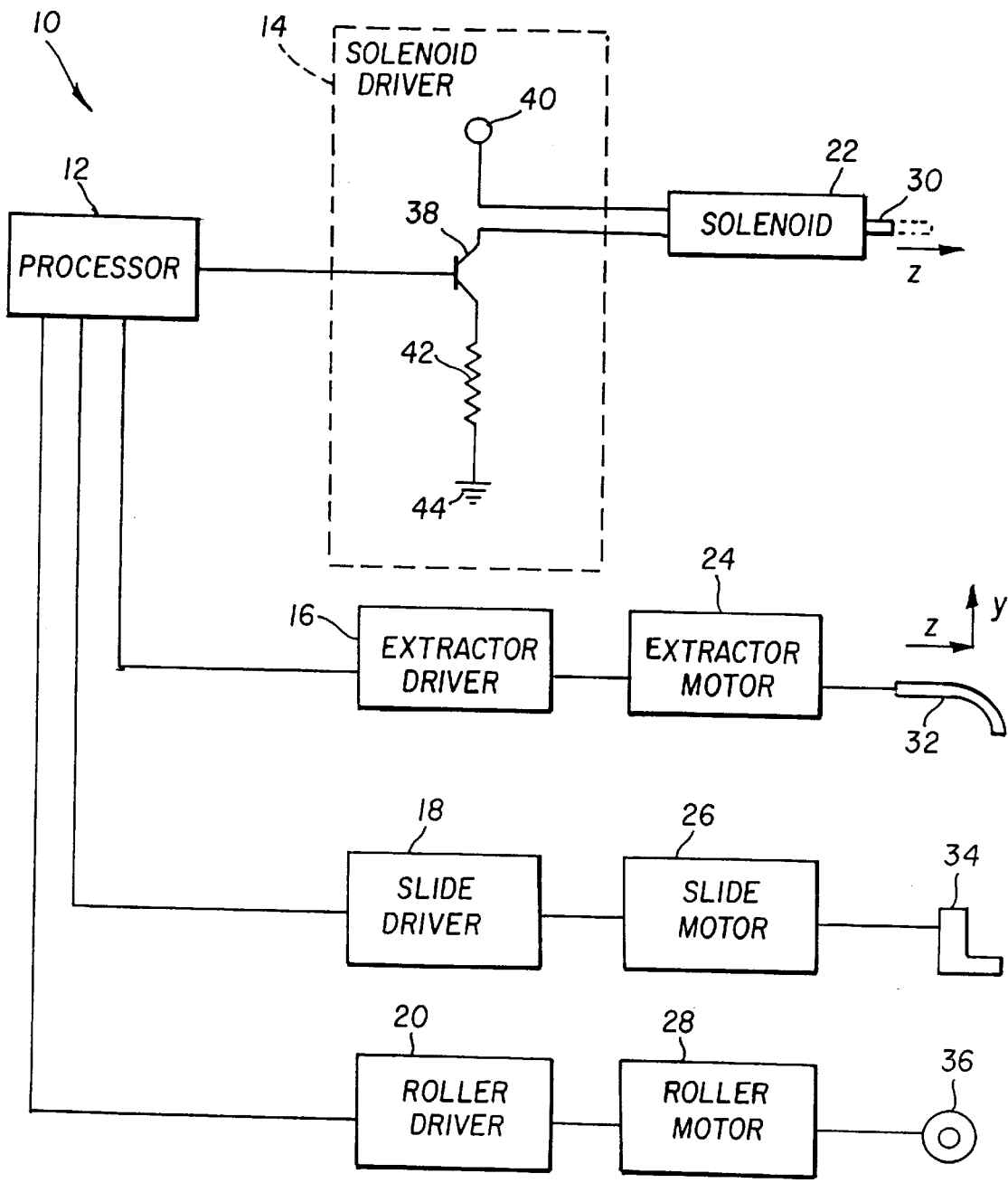
FIG. 1 is a block diagram of the film extraction system.

Referring in specific detail to the drawings, with common reference numbers identifying similar or identical elements, steps, and features, as shown in FIG. 1, the present invention is directed to a film slide and a film extractor system 10, and a method for using the slides and system 10 to extract a film segment from such a film slide. The film extraction system 10 includes a processor 12 operatively connected to a solenoid driver 14, an extractor driver 16, and optionally to a slide driver 18 and a roller driver 20, each of which is connected to a solenoid 22, an extractor motor 24, a slide motor 26, and a roller motor 28, respectively.

Figure 2:
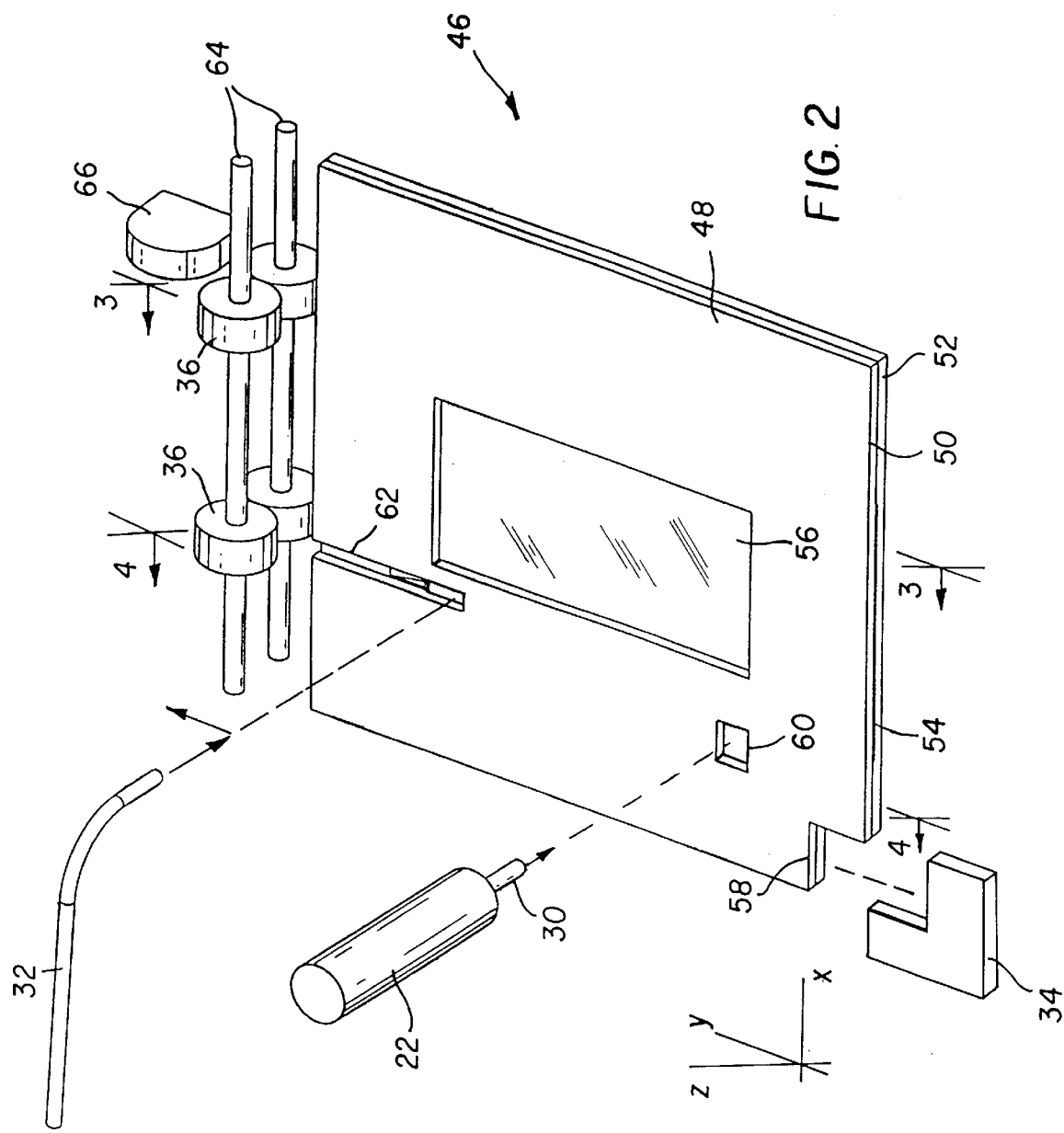
FIG. 2 is a perspective view of a slide with the components of the film extraction system prior to extraction of a film segment.

The processor 12 generates control signals to selectively drive the drivers 14–20 to control the components 22–28, respectively, so as to control various mechanical structures to present slides and associated slide mounts to devices for extracting film segments from the slides, and optionally for reading from or writing to magnetic tracks on the film segments. When driven by the solenoid driver 14, the solenoid 22 extends or retracts a solenoid piston 30 a predetermined distance along the z-axis with respect to a reference system as shown in FIG. 2. When driven by the extractor driver 16, in an extraction mode, the extractor arm 32 when in an initial position first moves a first predetermined distance in a first direction along the z-axis, and then moves a second predetermined distance in a second direction along the y-axis. In a reset mode, the extractor arm 32 moves the first predetermined distance in an opposite direction to the first direction along the z-axis, and then moves the second predetermined distance in an opposite direction to the second direction along the y-axis to return to the initial position.

When driven by the slide driver 18, a slide positioner 34 engages and positions a slide in a predetermined location relative to the solenoid 22, the extractor arm 32, and/or at least one roller 36. When driven by the roller driver 20, the roller 36 rotates about an axle in appropriate clockwise or counter-clockwise directions to take up a film segment from the slide, as described in greater detail below.

The processor 12 may perform as a central processing unit (CPU) of a film handling apparatus and also in conjunction with other computing systems. For example, the processor 12 may be a commercially available microprocessor and/or a microcontroller, such as the MC68HC05 microcontroller available from "MOTOROLA". By executing predetermined software and/or firmware routines, the processor 12 may operate the disclosed film extraction system 10 as an automated system with high accuracy and high handling rates for high volume film handling applications. The processor 12 generates the control signals on respective outputs or output ports, such as pins, with respective control signals being applied to respective drivers 14–20.

As shown in FIG. 1, the solenoid driver 14 may include a transistor 38 connected between a node 40 leading to an energy source and a resistor 42 connected to a ground 44. A contact of the transistor 38, such as a pin to the base of the transistor 38, receives the control signals from an appropriate output port of the processor 12. As shown in the illustrative embodiment in FIG. 1, the transistor 38 may be bipolar power transistors having the control signals applied to respective bases for selectively applying energy to the solenoid 22. The control signals thus control the switching state of the transistor 38.

For example, in an ON or first operative state, the transistor 38 provides a relatively low resistance to the flow of current from the energy source through the solenoid 22 and the current limiting resistor 42 to the ground 44. The flow of current through the solenoid 22 energizes the solenoid piston 30 to move along the z-axis between predetermined positions; for example, between an extended position and an retracted or rest position. Removal of the control signal from the solenoid driver 14 de-energizes the solenoid 22. The solenoid 22 may be configured to have a pre-loaded spring force to return the solenoid piston 30 to an initial rest position when de-energized.

In operation, the solenoid 22 may extend the solenoid piston 30 for a predetermined time. In one embodiment, the solenoid 22 may implement the predetermined time of extension of the solenoid piston 30 using an internal timing circuit such as a resistor-capacitor (RC) circuit (not shown in FIG. 1). In another embodiment, the predetermined time of extension of the solenoid piston 30 may be implemented by the software executed by the processor 12; that is, the predetermined time is implemented by a clock internal to the processor 12 which initiates changes in the control signals applied to the solenoid driver 14.

The solenoid 22 may operate in a toggling manner, such that a first activation pulse from the solenoid driver 14 causes the solenoid piston 30 to extend in the first direction along the z-axis, and locks the solenoid piston 30 into place in the extended position. A second activation pulse causes the solenoid piston 30 to retract in the direction opposite to the first direction along the z-axis to release the solenoid 22 from the locked extended position to return to the retracted position. Accordingly, the control signal output from the processor 12 to the solenoid driver 14 may be a pulse of a predetermined minimum duration, with the solenoid 22 responsive to such a minimum duration pulse to extend or retract the solenoid piston 30. Alternatively, the solenoid 22 may operate in response to a rising edge and/or a falling edge of a control signal.

Also, the solenoid 22 may operate in a continuous manner; that is, the solenoid 22 may extend the solenoid piston 30 as long as a continuous control signal is applied to the solenoid driver 14, and retract the piston 30 automatically if the continuous control signal is no long applied to the solenoid driver 14. When the solenoid piston 30 is extended, the end of the piston 30 engages a molded release feature of a slide, as described below in conjunction with FIGS. 2–9.

In the illustrative embodiment, the solenoid 22 is used to extend the piston 30. Alternatively, other mechanisms may be used to extend the piston 30; for example, a configuration of interactive gears, a stepper motor, an air cylinder, a configuration of cams, etc.

Each of the extractor driver 16, the slide driver 18, and the roller driver 20 may be configured in a manner similar or identical to the solenoid driver 14. The extractor driver 16 drives the extractor motor 24, which may be a stepper motor and/or a plurality of motors for causing the extractor arm 32, starting in an initial position, to sequentially move along the z-axis and then along the x-axis, as described above in an extraction mode, and to sequentially move along the z-axis and then along the x-axis to return to the initial position in a reset mode.

In FIG. 2, the components of the film extraction system 10 are illustrated in an initial position for extracting film from a slide 46. The slide 46 includes a slide mount 48 having a first portion 50 and a second portion 52 which are configured to form a cavity 54 therebetween and extending from one end of the slide 46 to a diametrically opposite end. The cavity 54 is configured such that a film segment 56 may be positioned and optionally held within the cavity of the slide 46. The slide 46 is configured to be gripped, held, and/or moved by the film extraction system 10 to a predetermined location for film extraction by, or in conjunction with, the rollers 36. In a preferred embodiment, the slide 46 includes a cut-out region 58 for engaging the slide positioner 34 such that movement of the slide positioner 34 positions the slide 46 adjacent to the roller 36 to extract the film segment 56, as described below.

The cavity 54 is configured to retain an "Advanced Photographic System" (APS) film segment. Alternatively, any other size film such as 35 mm film may be positioned in the cavity 54. The use of film segments having magnetic material appropriately disposed thereon, such as APS film segments having a registration located at a predetermined distance from an edge of the APS film segment and the photographic image on the film segment, causes the film segments to be readily written upon magnetically by a magnetic writing head 66 as described below.

The slide 46 also includes a locking aperture 60 which engages the solenoid piston 30 in the extended mode. The extended solenoid piston 30 may be used to prevent movement of the slide 46 in the direction of the y-axis, for example, by friction, if any, with the film segment 56 as the film segment 56 is extracted from the slide 46 by movement thereof in the direction of the y-axis.

The slide 46 includes an extraction slot 62 in the first portion 50 of the slide mount 48. The extractor arm 32 may enter and slidably engage the extraction slot 62 by aligning the end of the extractor arm 32 over the extraction slot 62, and by movement of the extractor arm 32 in the direction of the z-axis. The extraction slot 62 extends from an interior region of the slide 46 to an edge of the slide 46 adjacent to the roller 36, with the extraction slot 62 dimensioned to permit movement of the extractor arm 32 through the extraction slot 62 from the interior region to the edge of the slide 46.

As described below, a plurality of rollers 36 may be used which, upon engaging an end of the film segment 56, rotate in appropriate clockwise and counter-clockwise directions about a set of axles 64 mounted to a frame of the film extraction system 10 (not shown in FIG. 2). The rotation of the rollers 36 about the axles 64 extracts the film segment 56 from the cavity 54 of the slide 46. In addition, the rollers 36 may also be mounted to pass a predetermined portion of the film segment 56 having magnetic material disposed thereupon substantially near a magnetic writing head 66 for magnetically processing data to be read from or written to the magnetic material.

As shown in FIGS. 3 and 4, the film segment 56 is positioned within the cavity 54 between the first portion 50 and the second portion 52 of the slide mount 48. The film segment 56 typically stores images thereupon, and includes a plurality of perforations 68, 70, and 72 which may be longitudinally and generally linearly positioned along the length of the film segment 56 with regular and/or predetermined constant spacings therebetween. As shown in FIGS. 3 and 4, the film segment 56 is disposed within the cavity 54 such that the plurality of perforations 68, 70, and 72 extend from one edge of the slide 46 to a diametrically opposite edge. For illustrative purposes, the film segment 56 shown in FIGS. 3 and 4 has three perforations, but it is understood that the film segment 56 may include only two perforations, or more than three perforations, and that the disclosed film extraction system 10 may operation to extract film segments of any number of perforations per film segment.

Figure 5:
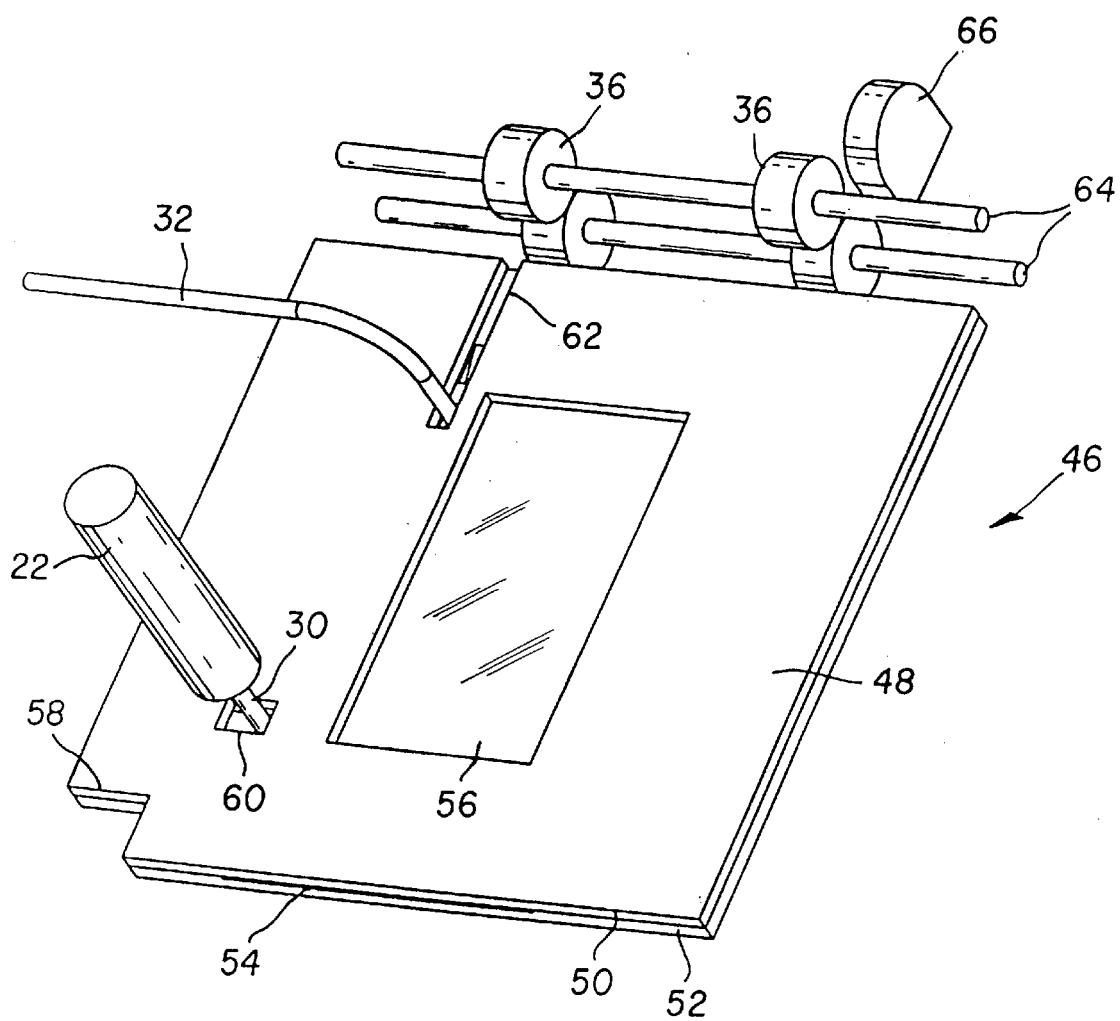
FIG. 5 is a perspective view of the film extraction system initially engaging the slide and the film segment positioned therein.

As shown in FIGS. 3 and 4, the film segment 56 includes a first perforation 68, a second perforation 72, and a third perforation 70. In a first embodiment shown in FIG. 3, the film segment 56 may be held within the cavity 54 by at least one internally disposed protrusion 74 engaging at least one perforation, for example, the third perforation 70. By frictional engagement with the protrusion 74, the engaged third perforation 70 and thus the entire film segment 56 are prevented from longitudinal movement within the cavity 54. In the first embodiment of the disclosed film extraction system 10, the extended solenoid piston 30 locks and holds the slide mount 48 as the extractor arm 32 enters the extraction slot 62 as shown in FIG. 5, engages the second perforation 72, and moves the second perforation 72 and the film segment 56 by overcoming the frictional resistance between the protrusion 74 and the third perforation 70.

The extractor arm 32, the extraction slot 62, and the perforations 68–72 are appropriately dimensioned so that the extractor arm 32 may enter and slidably engage the extraction slot 62, and so that the end of the extractor arm 32 may enter and engage the perforations 68–72 to move the film segment 56 out of the cavity 54. For example, the extraction slot 62 may be about 2 mm wide to permit at least the end of the extractor arm 32 to enter and move within the extraction slot 62. In addition, the perforations 68–72 may be square, rectangular, or circular having a width of about 2 mm along the direction parallel to the longitudinal length of the film segment 56 in the cavity 54. Accordingly, at least the extractor arm 32 may be less than about 2 mm; that is, less than the width of the extraction slot 62 and also less than the width of the perforations 68–72.

Figure 8:
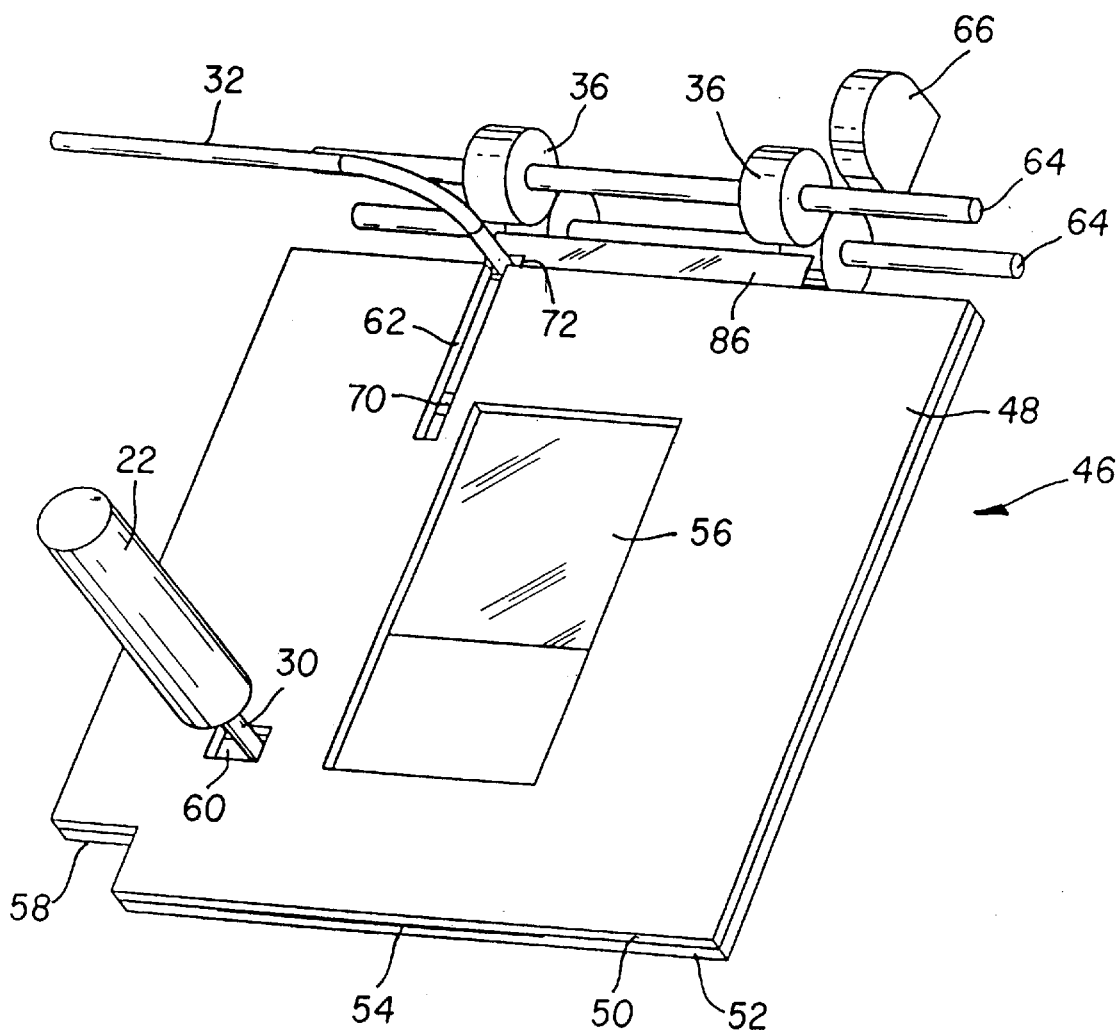
FIGS. 8 and 9 are perspective views of the film extraction system progressively extracting the film segment from the slide.
Figure 9:
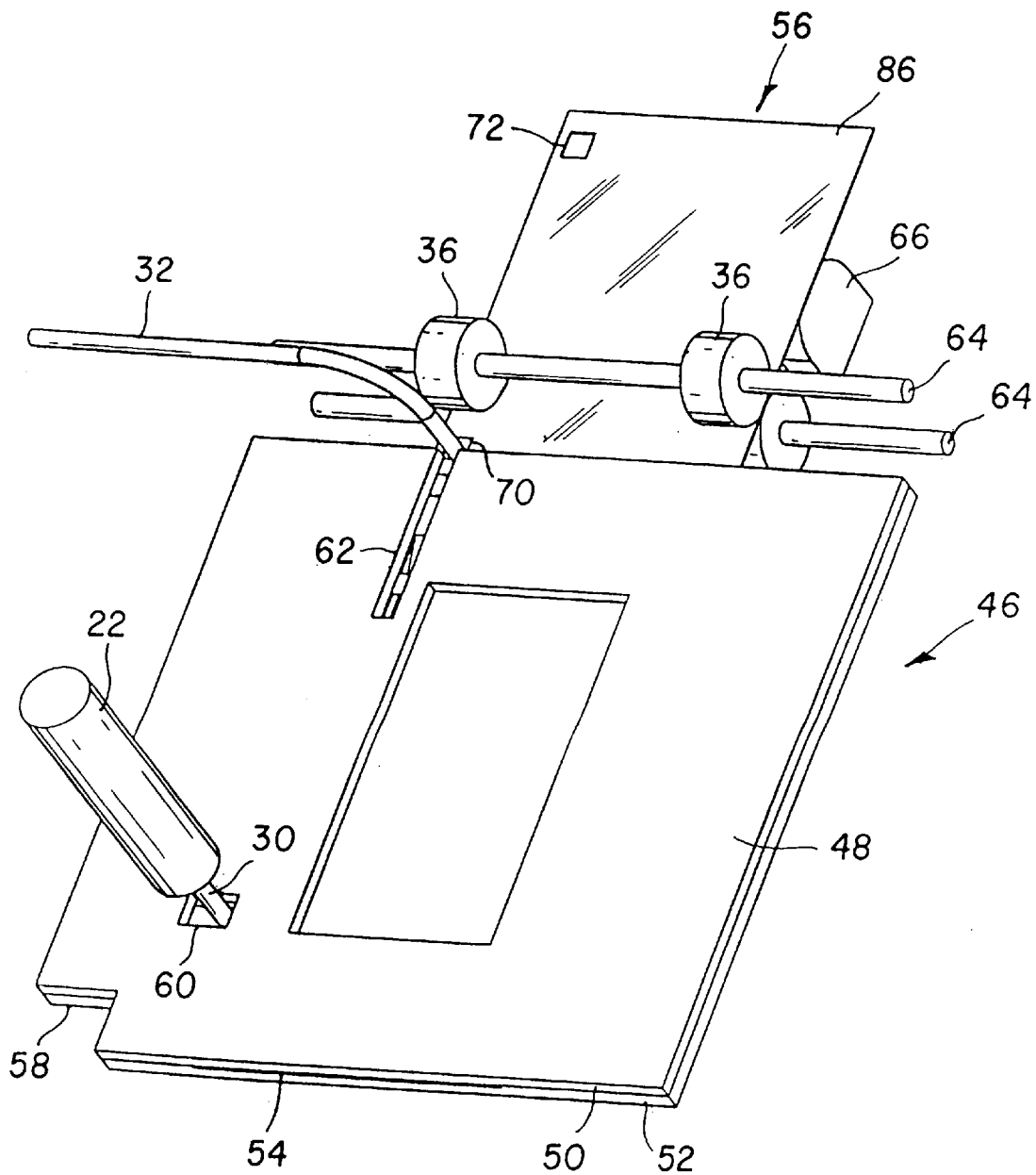

Continuous movement of the extractor arm 32 through the extraction slot 62 extracts the film segment 56 from the cavity 54, as shown in FIG. 8. Subsequent contact of the film segment 56 with the rollers 36 allows the rollers 36 to contribute to, and then take over, extraction of the film segment 56 from the cavity 54 as shown in FIG. 9. The extractor arm 32 may then disengage the second perforation 72, and optionally engages the other perforations such as the perforations 68 and 70 to continue the extraction operation in conjunction with the rollers 36.

In an alternative embodiment shown in FIG. 4, the slide 46 may include a latch mechanism having a latch end 76, as a element protruding into the cavity 54, disposed within a latch indentation 78, for example, in the second portion 52 of the slide mount 48. The latch end 76 is configured to engage a perforation of the film segment 56; for example, the latch mechanism having the latch end 76 may be positioned to engage the first perforation 68 of the film segment 56.

To extract the film segment 56 held in the cavity 54 by the latch end 76, the disclosed film extraction system 10 extends the solenoid piston 30 into the locking aperture 60, as shown in FIG. 5, which disengages the latch end 76 from the first perforation 68. In addition, in the embodiment shown in FIG. 4, the solenoid piston 30 may also engage the locking aperture 60 to prevent movement of the slide 46 in the direction of the y-axis, for example, by friction, if any, with the film segment 56 as the film segment 56 is extracted from the slide 46 by movement thereof in the direction of the y-axis.

Figure 6:
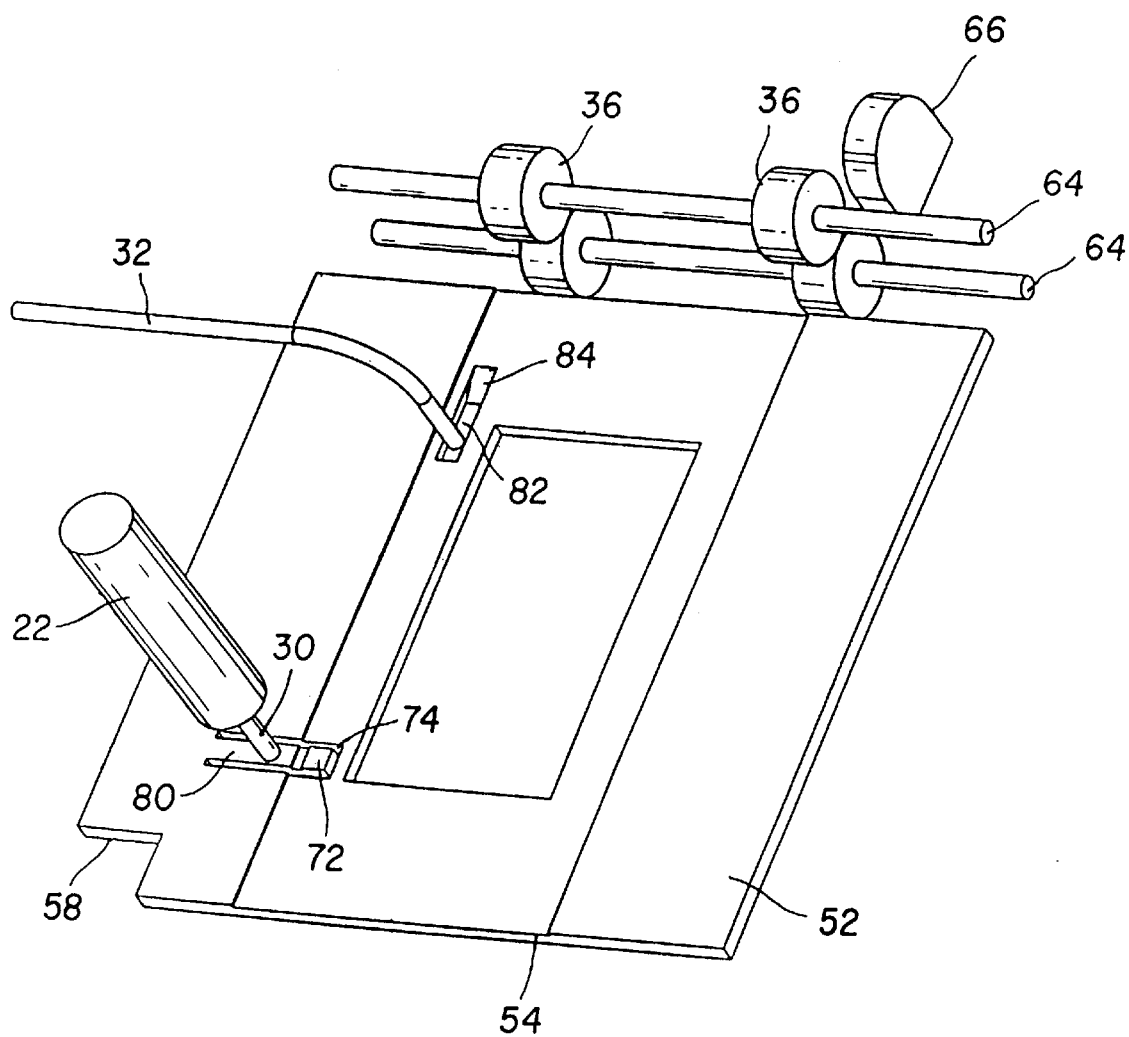
FIG. 6 is a perspective view of the film extraction system engaging internally disposed elements of the slide.
Figure 7:
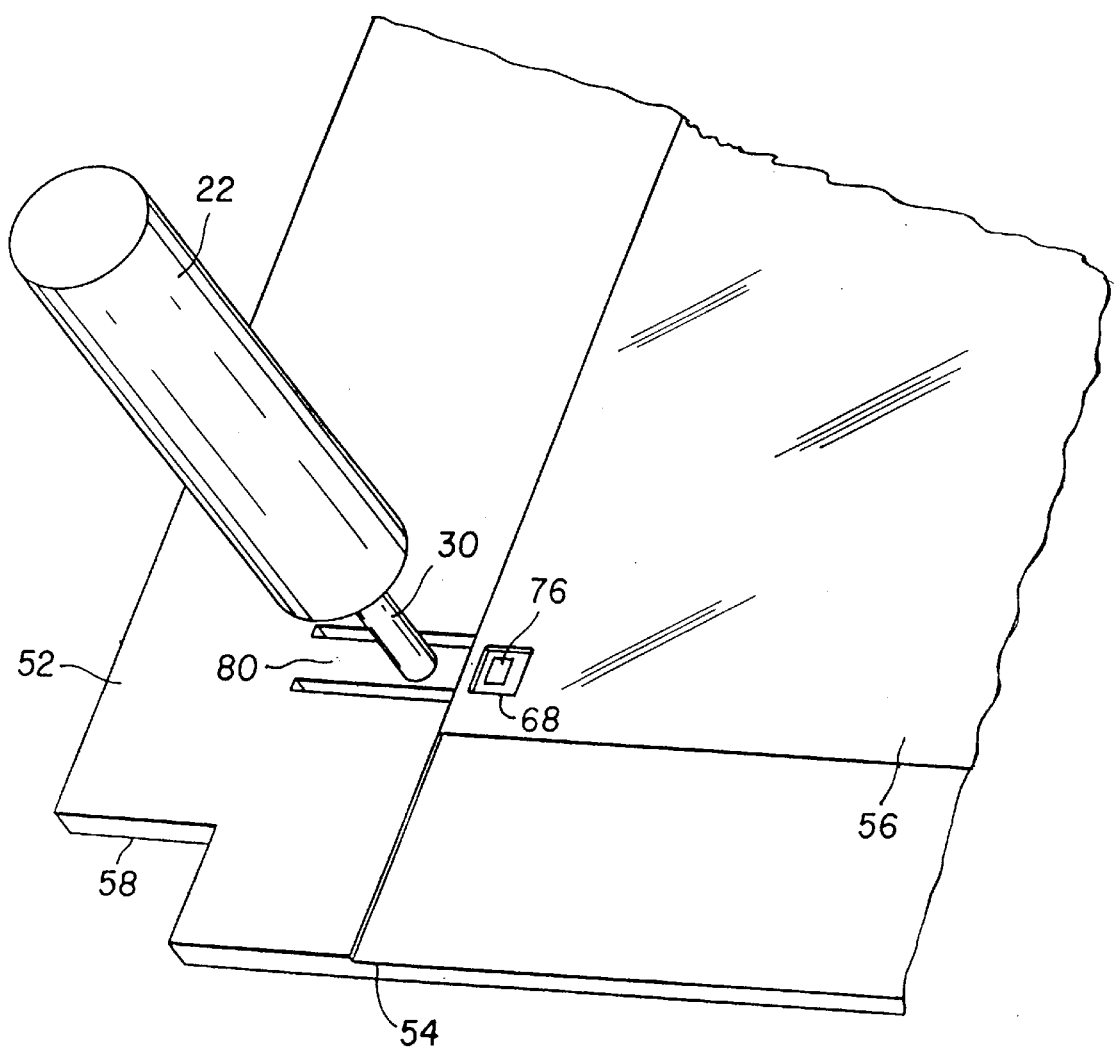
FIG. 7 is a cut-away perspective view of the film extraction system disengaging a latch from a perforation of the film segment.

Referring to FIGS. 6 and 7 in conjunction with FIG. 4, the latching mechanism is shown in greater detail. The second portion 52 of the slide mount 48 is shown in FIG. 6 without the film segment 56, and is shown in FIG. 7 with the film segment 56 disposed in the cavity 54. The latching mechanism includes a resilient member 80 integral with the second portion 52 of the slide mount 48, with the latch end 76 connected to the resilient member 80 having a hinge-like connection to the second portion 52, and extending into the cavity 54. The resilient member 80 is configured such that an intermediate portion thereof is substantially aligned with the locking aperture 60. Pressure applied to the intermediate portion of the resilient member 80 by the solenoid piston 30 in the first direction along the z-axis. Such pressure actuates the latch mechanism by causing a fulcrum-like action of the resilient member 80 to move the latch end 76 out of the first perforation 68 and into the latch indentation 78.

The film segment 56 is then free to move longitudinally through the cavity 54 upon engagement of the extractor arm 32 with other perforations of the film segment 56, and subsequent movement of the extractor arm 32 and the engaged perforations through the cavity 54, as shown in FIGS. 8 and 9. It is understood that the latch mechanism may include other structure for providing resilience, such as a spring positioned under the latch end 76.

Referring to FIG. 6, the extraction slot 62 may also include a slot recess 82 in the second portion 52 of the slide mount 48. The end of the extractor arm 32 may then extend through the extraction slot 62, the second perforation 72, and the slot recess 82 to provide relatively secure engagement of the extractor arm 32 with the perforations of the film segment 56 to efficiently extract the film segment 56. A ramp 84 may be formed in the slot recess 82 at the end thereof which is closer to the rollers 36. In response to a sloping engagement of the end of the extractor arm 32 with the ramp 84 as the extractor arm 32 moves toward the rollers 36, the extractor arm 32 is caused to disengage the slot recess 82 as the second perforation 72 approaches the rollers 36.

In an alternative embodiment, the extractor motor 24 may include a sensor or other mechanisms known in the art for sensing the engagement of the extractor arm 32 with the ramp 84, and then for responding to such sensing by returning the extractor arm 32 to the initial position, as described above.

As shown in FIGS. 8 and 9, as the end 86 of film segment 56 approaches and engages the rollers 36, the rotation of the rollers 36 provides additional force to achieve extraction motion of the film segment 56 from the cavity 54. In addition, once the rollers 36 engage the end 86 of the film segment 56, the extractor arm 32 may fully disengage from the second perforation 72, and optionally may engage other perforations such as the third perforation 70, as shown in FIG. 9, to further extract the film segment 56. The rollers 36 may be controlled by the roller motor 28 to longitudinally pass a predetermined portion of the film segment 56 having magnetic material disposed thereupon (not shown in FIG. 9) at an appropriate speed to be magnetically read and/or written to by the magnetic writing head 66.

The extracted film segment 56 may then be handled by a film segment printing system and method, such as described in U.S. patent application Ser. No. 08/897,171 entitled: FILM SEGMENT PRINTING SYSTEM AND METHOD, and filed in the names of David Patton, Daniel Pagano, Dale McIntyre, and Edward Weissberger; which is incorporated herein by reference.

Figure 10:
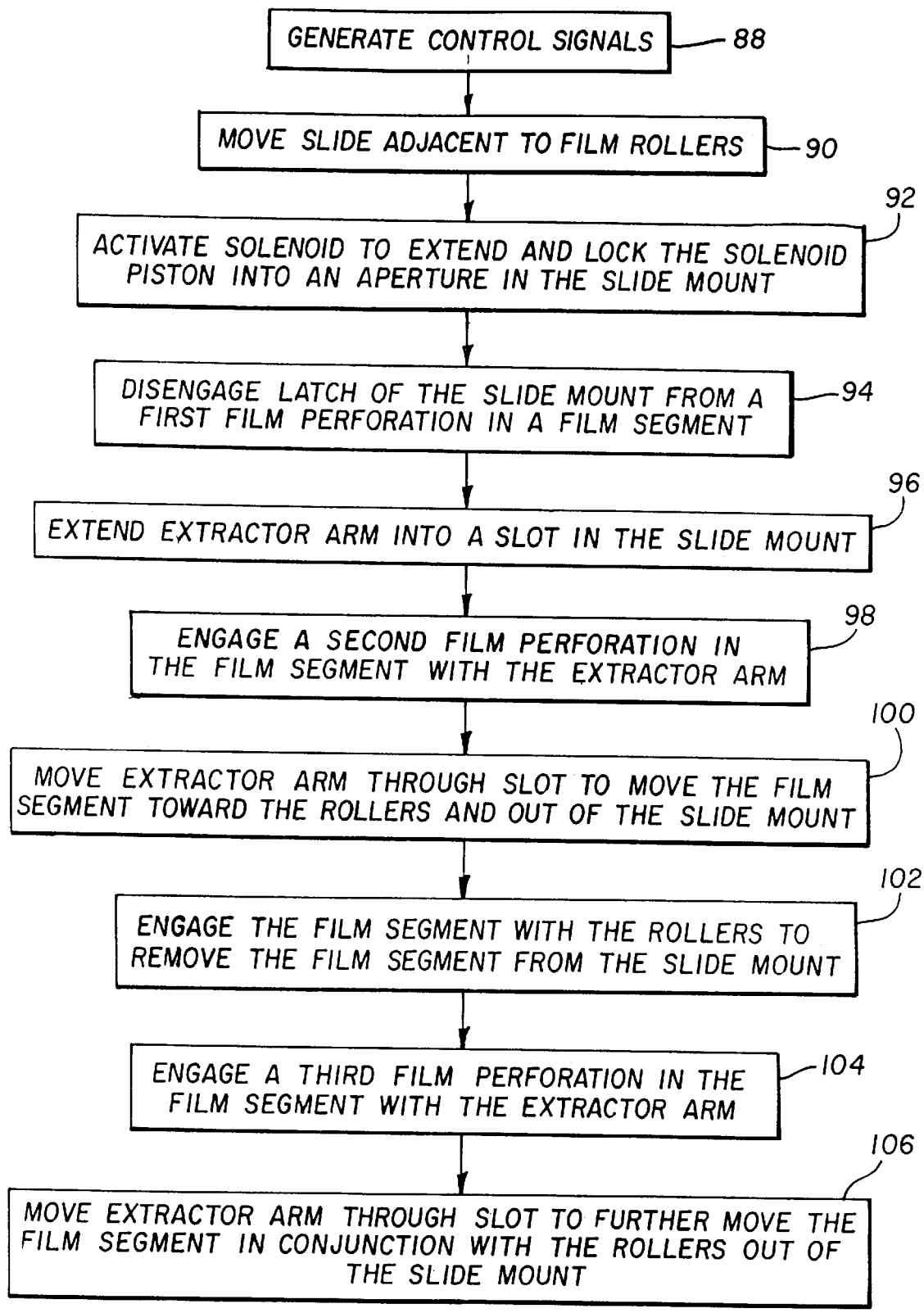
FIG. 10 is a flowchart of the method of operation of the disclosed film extraction system.

In use, the disclosed film extraction system 10 operates according to the method shown in FIG. 10, including the steps of: generating (88) control signals using the processor 12 to control the drivers 14–20; moving (90) the slide 46 adjacent to the rollers 36 using a slide positioner 34; and activating (92) the solenoid 22 to extend and lock the solenoid piston 30 into the locking aperture 60 in the slide mount 48. In performing step 90 or in a separate step, the method also positions the slide 46 to a position relative to the solenoid 22 and the extractor arm 32, as shown in FIG. 2, such that the piston 30 and the extractor arm 32 are substantially aligned with the locking aperture 60 and the slot 62, respectively.

If the embodiment shown in FIGS. 4, 6, and 7 is implemented to secure the film segment 56 in the cavity 54, the method includes the step of disengaging (94) a latch end 76 of the slide mount 48 from a first perforation 68 in the film segment 56.

For all embodiments, the method then includes the steps of: extending (96) the extractor arm 32 into the extraction slot 62 in the slide mount 48; engaging (98) a second perforation 72 in the film segment 56 with the extractor arm 32; moving (100) the extractor arm 32 through extraction slot 62 to move the film segment 56 toward the rollers 36 and out of the slide mount 48; and engaging (102) the film segment with the rollers 36 to remove the film segment 56 from the slide mount 48. Optionally, the method may then include the steps of: engaging (104) at least a third film perforation in the film segment with the extractor arm 32; and moving (106) the extractor arm 32 through the extraction slot 62 to further move the film segment 56 in conjunction with the rollers 36 out of the slide mount 48. Steps 104 and 106 may be performed repeatedly for a plurality of film perforations until the film segment 56 is substantially or completely extracted from the cavity 54.

Steps 88–106 may be timed such that movement of extractor arm 32 and the film segment 56 is controlled to match a predetermined constant spacing between the perforations 68–72 of the film segment 56, such that repeated motions of the extractor arm 32 as described above coincide with the positions of the perforations to ensure engagement of the extractor arm 32 with the perforations. Alternatively, the extractor arm 32 may slidably engage the film segment 56 and rely on gravity and/or a force along the z-axis provided by the extractor motor 24 to push the extractor arm 32 into a perforation passing thereunder. In addition, the various steps 88–106 shown in FIG. 10 may be executed by the processor 12 to repeatedly loop in a set of operating cycles for cyclically operating the solenoid 22 and the solenoid piston 30 thereof, for cyclically operating the extractor arm 32, for cyclically operating the slide positioner 34, for cyclically operating the rollers 36, and optionally for cyclically operating the magnetic writing head 66. Such cyclic operation of the various components of the disclosed film extraction system 10 may implement an automated, high speed film handling system with high accuracy.

While the disclosed film extraction system and slide for use therewith, and the disclosed film extraction method are particularly shown and described herein with reference to the preferred embodiments, it is to be understood that various modifications in form and detail may be made without departing from the scope and spirit of the present invention.

For example, the cavity 54 may be formed by indentations in only the first portion 50, only the second portion 52, or both the first portion 50 and the second portion 52. In addition, the cavity 54 may extend from the edge closest to the rollers 36 to at least a location in the interior of at least the first portion 50 and the second portion 52; that is, the cavity 54 extends from one side of the slide 46 but may or may not extend completely to the other side of the slide 46.

Further, the locking aperture 60 may be formed in only the first portion 50, only the second portion 52, or both the first portion 50 and the second portion 52; that is, the locking aperture 60 may or may not extend through the entire slide 46. In addition, the locking aperture 60 may be positioned on the same side of the slide 46 as the extraction slot 62, or may be positioned on a different side, such as on the opposite face of the slide 46. In addition, the cut-out region 58 may be formed from the first portion 50, from the second portion 52, or from both the first portion 50 and the second portion 52 as shown in FIG. 2. Alternatively, the slide positioner 34 may engage a structure attached to the slide 46 separate from the first portion 50 and the second portion 52 for positioning the slide 46.

In addition, the latch mechanism, including the resilient member 80, may be formed from or attached to the first portion 50 and/or the second portion 52. Alternatively, the resilient member 80 may be formed from or attached to the first portion 50 but may be positioned in a latch indentation in the second portion 52. Further, the slot recess 82 and/or the ramp 84 may be formed in the first portion 50 and/or the second portion 52. Further, the embodiments shown in FIGS. 3 and 4 may be combined to use at least one protrusion 74 and at least one latch end 76 with at least one resilient member 80 to secure the film segment 56 in the cavity 54 by frictional resistance which may be overcome by the motion of the extractor arm 32.

The invention has been described in detail with particular reference to certain preferred embodiments thereof, but it will be understood that variations and modifications can be effected within the spirit and scope of the invention.

PARTS LIST 10 film extraction system
12 processor
14 solenoid driver
16 extractor driver
18 slide driver
20 roller driver
22 solenoid
24 extractor motor
26 slide motor
28 roller motor
30 solenoid piston
32 extractor arm
34 slide positioner
36 roller
38 transistor
40 node to energy source
42 resistor
44 ground
46 slide
48 slide mount
50 first portion
52 second portion
54 cavity
56 film segment
58 cut-out region
60 locking aperture
62 extraction slot
64 axles
66 magnetic writing head
68 first perforation
70 third perforation
72 second perforation
74 protrusion
76 latch end
78 latch indentation
80 resilient member
82 slot recess
84 ramp
86 end of film segment
88 generate control signals
90 move slide
92 activate solenoid
94 disengage latch
96 extend extractor
98 engage perforation
100 move extractor arm
102 engage film segment
104 engage perforation
106 move extractor arm

What is claimed is:

1. A film extraction system for extracting a film segment from a slide mount, the slide mount having a cavity, a locking aperture, a latch mechanism securely engaging the film segment in the cavity, and a slot extending from an interior region to an edge of the slide mount, the film extraction system comprising:

a piston for contacting the latch mechanism to disengage the latch mechanism from the film segment; and an extractor arm for entering the slot to engage a perforation in the film segment, and for slidably moving within the slot to move the film segment through the cavity in the direction of the edge of the slide mount to exit the cavity.

2. The film extraction system of claim 1 further comprising:

a processor for generating control signals sequentially to cause the piston to disengage the latch mechanism, to cause the extractor arm to engage the perforation, and to cause the extractor arm to slidably move within the slot.

3. The film extraction system of claim 2 further comprising:

a solenoid for extending the piston to contact the latch mechanism; and a solenoid driver, responsive to the control signals from the processor, for causing the solenoid to extend the piston.

4. The film extraction system of claim 2 further comprising:

an extractor motor for moving the extractor arm in a first direction to enter the slot, and for moving the extractor arm in a second direction to slidably move within the slot; and an extractor driver, responsive to the control signals from the processor, for causing the movement of the extractor arm in the first and second directions.

5. The film extraction system of claim 1 further comprising:
   at least one roller adjacent to the slide mount for extracting the film segment therefrom.

6. The film extraction system of claim 5 further comprising:
   a magnetic die located adjacent to the at least one roller;
   wherein the extracted film segment has magnetic material thereon which passes adjacent to the magnetic device when the at least one roller passes a predetermined portion of the extracted film segment adjacent to the magnetic device.

7. The film extraction system of claim 5 further comprising:
   a slide positioner for engaging the slide mount to position the edge of the slide mount adjacent to the roller.

8. A method for extracting a film segment from a slide mount comprising the steps of:
   (a) extending a piston into a locking aperture in the slide mount;
   (b) disengaging a latch end from a first perforation in the film segment;
   (c) extending the extractor arm into the extraction slot in the slide mount;
   (d) engaging a second perforation in the film segment with the extractor arm; and
   (e) moving the extractor arm through the extraction slot to extract the film segment out of the slide mount.

9. The method of claim 8 further comprising the steps of:
   generating control signals using a processor to control the piston and the extractor arm.

10. The method of claim 8 further comprising, before step (a), the step of:
    (a1) moving the slide mount using a slide positioner to a position to be engaged by the piston and the extractor arm.

11. The method of claim 10 wherein the step (a1) of moving the slide mount includes the step of:
    (a2) moving the slide mount using a slide positioner to a position adjacent to at least one roller.

12. The method of claim 11 further comprises, after step (e), the step of:
    (f) engaging the film segment with the roller to further extract the film segment from the slide mount.

13. The method of claim 8 further comprising, after step (e), the steps of:
    (f) engaging at least a third film perforation in the film segment with the extractor arm; and
    (g) moving the extractor arm through the extraction slot to further extract the film segment.

* * * * *